United States Patent [19]
Ackeret

[11] 3,994,550
[45] Nov. 30, 1976

[54] HOLDERS FOR TAPE CASSETTES

[75] Inventor: Peter Ackeret, Kusnacht, Switzerland

[73] Assignee: IDN Inventions and Development of Novelties AG, Lenzerheide, Switzerland

[22] Filed: May 30, 1975

[21] Appl. No.: 582,127

[30] Foreign Application Priority Data
June 5, 1974 Germany.............................. 2427104

[52] U.S. Cl................................. 312/319; 312/15; 312/333; 206/387
[51] Int. Cl.²................ A47B 81/06; B65D 85/672
[58] Field of Search .......... 312/319, 333, 111, 330; 206/378, 376, 387

[56] References Cited
UNITED STATES PATENTS

| 1,450,974 | 4/1923 | Heotes................................ 312/333 |
| 1,654,703 | 1/1928 | Rice.................................... 206/378 |
| 2,170,093 | 8/1939 | Pringle et al....................... 312/319 |
| 2,630,363 | 3/1953 | Hake................................... 312/111 |
| 3,658,398 | 4/1972 | Abbate, Jr. et al................ 312/333 |
| 3,677,396 | 7/1972 | Staar................................... 206/1.5 |
| 3,702,132 | 11/1972 | Fites et al. ......................... 206/387 |
| 3,866,990 | 2/1975 | McRae................................ 312/15 |
| 3,894,655 | 7/1975 | Mattheis et al...................... 206/1.5 |
| 3,899,229 | 8/1975 | Ackeret............................. 312/111 |
| 3,904,259 | 9/1975 | Hoffmann et al.................. 312/111 |

FOREIGN PATENTS OR APPLICATIONS
949,041    8/1956    Germany .......................... 206/378

Primary Examiner—Paul R. Gilliam
Assistant Examiner—Victor N. Sakran
Attorney, Agent, or Firm—H. Dale Palmatier

[57] ABSTRACT

A holder for a tape cassette forming a U-shaped housing with shanks to fit over the projections which laterally flank the long open side of the cassette, the holder having one end wall and a spring bearing against the end wall to urge the cassette longitudinally of the housing, the other end of the housing having a latch retaining the cassette in the housing, and arms and cams which fit into the tape reels of the cassette.

5 Claims, 2 Drawing Figures

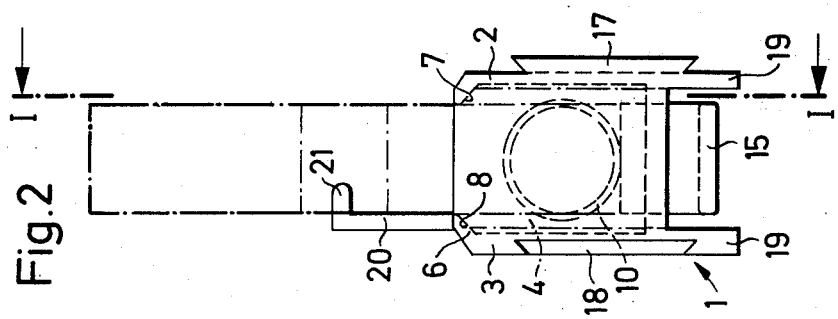
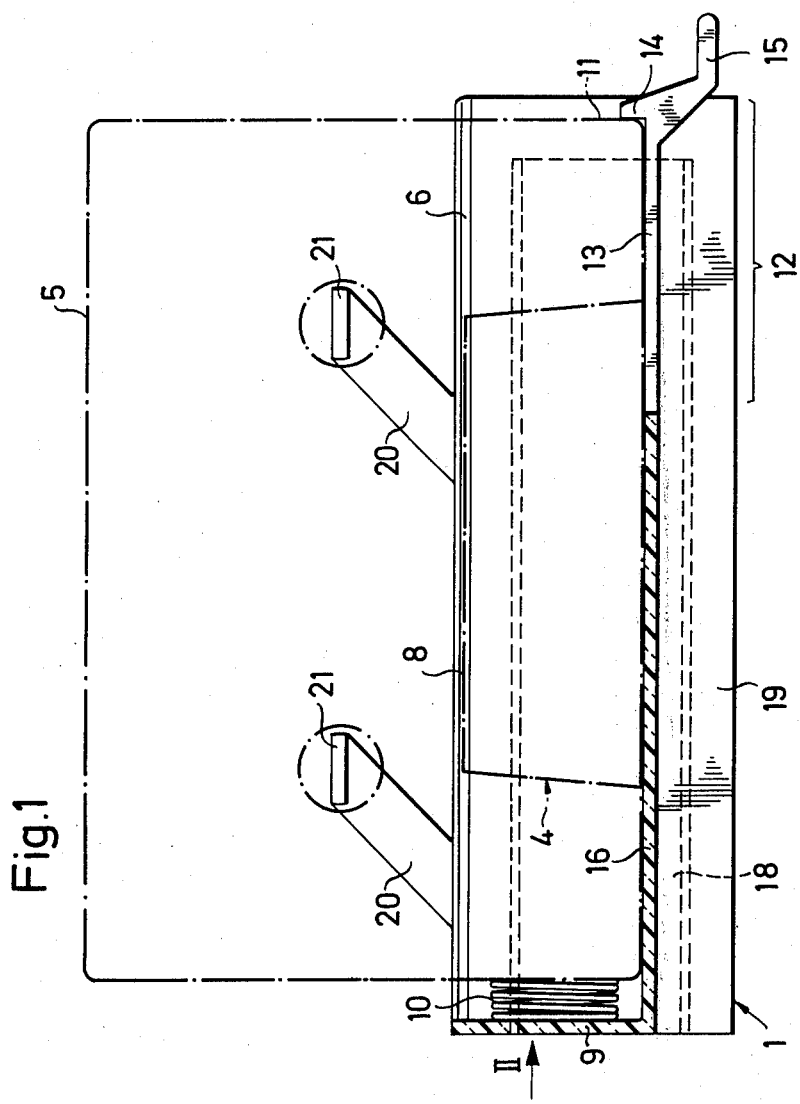

HOLDERS FOR TAPE CASSETTES

The invention relates to holders for tape cassettes for example magnetic tape cassettes and the like. The invention relates especially to holders comprising a U-shaped supporting rail, the shanks of which engage closely with their inwardly-curved sides in the manner of a slide guide over projections which laterally flank the long open side of the cassette.

Holders have been proposed which have been provided with dovetail-shaped grooves on the rear wall and were suspended together with the cassettes by being pushed into a supporting rail or plate which was provided with corresponding strips and was to be fixed to a supporting wall.

In other proposals the supporting rails projected over the cassette on either side so that the cassettes could be suspended in filing cabinets by means of the projecting ends of the supporting rails.

The object of the invention is to allow, with simple holders of this type, a type of magazine storage of cassettes without any additional parts being necessary for this purpose, and in addition to render the removal of cassettes from a single holder or a series of stacked cassettes as convenient as possible.

The invention consists in the fact that the supporting rail has at one end a base wall against which resilient pressure means rests, and in that the cassette when pushed into the supporting rail counter to the spring pressure is held firmly in the inserted position by means of a holding and locking means.

The holding and locking means preferably consists of a tongue, with a lug and release key moulded onto it, extracted from the rear wall of the supporting rail.

For the connection of holders, i.e. in order to stack cassettes, the shanks have on their outer sides a dovetail-shaped strip and a corresponding groove for example.

If the tape spools of the cassette are to be blocked during storage, outward-springing arms provided with locking cams for the tape spools may be fitted onto at least one of the U-shanks.

By way of example only an embodiment of the invention will now be described in greater detail with reference to the accompanying drawings, of which:

FIG. 1 is a longitudinal section through the holder in a plane parallel to the largest cassette surface, and FIG. 2 is an end view of the holder.

The holder consists substantially of a supporting rail 1, the cross-section of which is substantially U-shaped as seen in FIG. 2. The dimensions are such that the distance between the two U-shanks 2, 3 just allows a cassette 5 with its projections 4 laterally flanking the side face of the cassette to be pushed in. The inwardly-curved edges 6, 7 of the U-shanks 2, 3 thereby engage over the edges 8 of the projectings 4 of the cassette.

The holder has at one end — on the left in FIG. 1 — an end wall 9 which serves as support for a helical spring 10. The spring 10 is compressed when the cassette 5 is pushed into the holder (from the right in FIG. 1). To ensure that the cassette 5 is held firmly in the inserted position, a lug 14 engages over the side 11 of the cassette. The lug 14 is situated at the end of a tongue 13 which is produced by slotting base wall 16 of the rail 1 over a length 12 and parallel to the insertion direction of the cassette 5. The tongue 13 can be deflected downwards in relation to the remainder of the rail 1. When pressure is exerted on the key 15 formed on the tongue 13, the cassette is therefore pushed out by the spring 10 and can be removed. The edges 6, 7 thereby rest with slight pre-tension against the cassette 5 and slow the release of the latter to such an extent that it is not catapulted out.

On the outer sides of the shanks 2, 3 there are means for the connection of several similar holders. Dovetail guides are provided here for example, which when brought together engage with one another on the tongue-and-groove principle, with a strip 17 on the shank 2 and a corresponding groove 18 on the shank 3.

The base strips 19 of the rail 1 raise the holder to such an extent that the key 15 has adequate clearance for its operation and does not contact a surface on which the cassette may be resting.

If required, the holder may be so constructed that the tape spools of the cassette 5 are secured against accidental rotation when the cassette is in the holder. For this purpose, in the embodiment shown outwardly sprung arms 20 with locking cams 21 are provided which are moulded onto the shanks 3 and have cams 21 which engage the tape spools but can be pushed out of the core apertures of the cassette when it is ejected and drop in again after insertion.

The entire holder, apart from the spring 10, is a one-piece member made of a preferably thermoplastic plastics material, e.g. polystyrole.

What we claim is:

1. A holder for tape cassettes and the like, the holder being in the form of an elongate U-shaped supporting rail having side walls confronting each other to receive the cassette therebetween, the side walls having inwardly-curved edges to slide over the projections which laterally flank the long open side of the cassette, the supporting rail having at one end a transverse end wall to confront the end of the cassette, resilient means on the transverse end wall and urging the cassette along the rail and away from the end wall, and the rail having a holding and locking means at the end opposite the end wall and releasably securing the cassette against the urging of the spring.

2. A holder according to claim 1, in which the holding and locking means consists of a tongue with lug and release key moulded onto it, the means being formed as part of the base wall of the holder.

3. A holder according to claim 1 in which the side walls have, on their outer sides, means for the connection of other holders.

4. A holder according to claim 3 in which said side walls have, respectively, dovetail-shaped inserts and receptacles to fit together with like inserts and receptacles of other similar holders.

5. A holder according to claim 1, and further including outward-springing arms with tape spool-locking cams mounted on at least one side wall.

* * * * *